(12) United States Patent
Timms (10) Patent No.: US 8,346,314 B2
(45) Date of Patent: *Jan. 1, 2013

(54) MOBILE COMMUNICATIONS NETWORK SLOT CYCLE

(75) Inventor: Don Timms, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/759,358

(22) Filed: Jun. 7, 2007

(65) Prior Publication Data

US 2007/0281709 A1    Dec. 6, 2007

(51) Int. Cl.
*H04B 1/38*    (2006.01)

(52) U.S. Cl. ..... 455/574; 455/418; 455/419; 455/435.1; 455/456.1; 455/515; 455/67.11; 455/458

(58) Field of Classification Search ............ 455/418, 455/419, 435.1, 456.2, 515, 67.11, 574, 458
See application file for complete search history.

(56) References Cited

U.S. PATENT DOCUMENTS

| | | |
|---|---|---|
| 5,301,225 A | 4/1994 | Suzuki et al. |
| 5,392,287 A | 2/1995 | Tiedemann et al. |
| 5,491,718 A | 2/1996 | Gould et al. |
| 5,570,369 A | 10/1996 | Jokinen |
| 5,590,396 A | 12/1996 | Henry |
| 5,627,882 A | 5/1997 | Chien et al. |
| 5,884,196 A | 3/1999 | Lekven et al. |
| 5,910,944 A | 6/1999 | Callicotte et al. |
| 6,041,241 A * | 3/2000 | Willey ............................. 455/574 |
| 6,289,227 B1 | 9/2001 | Shi |
| 6,418,315 B1 * | 7/2002 | Seo et al. ..................... 455/435.1 |
| 6,501,969 B1 | 12/2002 | Cannon et al. |
| 6,522,873 B1 | 2/2003 | Moles et al. |
| 6,822,973 B2 * | 11/2004 | Kelley et al. ................... 370/503 |
| 6,865,398 B2 * | 3/2005 | Mangal et al. ............. 455/552.1 |
| 6,980,818 B2 * | 12/2005 | Harris et al. ................... 455/466 |

(Continued)

FOREIGN PATENT DOCUMENTS

GB    2 328 588 A    2/1999

(Continued)

OTHER PUBLICATIONS

International Search Report: PCT/US2005/013177 (Sep. 16, 2005).

*Primary Examiner* — Kwasi Karikari (57) ABSTRACT

The slot cycle index is currently negotiated by a mobile handset and a base station. However, if the slot cycle index could be selected dynamically a mobile handset that operates more efficiently for the user would result. Talk time could be maximized when the battery, or other mobile power source is low, while connect time for a mobile call could be minimized when the battery is near fully charged or at times when the user is likely to make a mobile call. Additionally, location could be used to determine the likelihood that the user will make a mobile call. However, current network usage would typically need to be considered when determining if the slot cycle index should be changed. Mobile handset users could also charged for quicker response times, or mobile handset users on more expensive plans could be given typically faster response times. Many different things can be considered in determining when to adjust slot cycle index, such as, for example, battery power, time of day, or system loading. Additionally, combinations of factors can be considered to determine when to adjust slot cycle index.

17 Claims, 6 Drawing Sheets

U.S. PATENT DOCUMENTS

| | | | |
|---|---|---|---|
| 6,999,799 B1 * | 2/2006 | Almassy | 455/574 |
| 7,043,266 B2 * | 5/2006 | Chaturvedi et al. | 455/519 |
| 7,047,005 B2 * | 5/2006 | Kinnavy | 455/434 |
| 7,149,535 B1 * | 12/2006 | Chaturvedi et al. | 455/458 |
| 7,373,157 B2 * | 5/2008 | Sinnarajah et al. | 455/458 |
| 2002/0025811 A1 | 2/2002 | Wiley | |
| 2002/0142792 A1 | 10/2002 | Martinez | |
| 2002/0191583 A1 * | 12/2002 | Harris et al. | 370/345 |
| 2003/0114156 A1 * | 6/2003 | Kinnavy | 455/434 |
| 2003/0190888 A1 * | 10/2003 | Mangal et al. | 455/3.05 |
| 2004/0072559 A1 | 4/2004 | Kakumaru et al. | |
| 2004/0097245 A1 | 5/2004 | Sheth et al. | |
| 2004/0176107 A1 | 9/2004 | Chadha | |
| 2004/0203490 A1 | 10/2004 | Kaplan | |
| 2005/0009548 A1 * | 1/2005 | Kelley et al. | 455/509 |
| 2005/0014519 A1 * | 1/2005 | Sinnarajah et al. | 455/458 |
| 2005/0164741 A1 * | 7/2005 | Rajkotia et al. | 455/561 |

FOREIGN PATENT DOCUMENTS

| | | |
|---|---|---|
| JP | 05-014458 | 1/1993 |
| JP | 10-221426 | 8/1998 |
| JP | 11-261430 | 9/1999 |
| JP | 2004-120258 | 4/2004 |
| WO | WO 02/093948 A | 11/2002 |
| WO | WO 03/053093 A | 6/2003 |

* cited by examiner

MOBILE COMMUNICATIONS NETWORK SLOT CYCLE

FIELD

The present invention relates generally to communications devices, and more particularly to mobile hand held communications networks.

BACKGROUND

Many people are familiar with mobile handsets. Mobile handsets are typically small electronic devices that communicate with a base station to place mobile calls. Many mobile handsets also perform other features in addition to placing mobile calls. For example, some mobile handsets are capable of transmitting data in addition to voice.

A popular feature on many mobile handsets is push-to-talk. With push-to-talk a mobile handset user is able to push a single button to complete a call to a specific mobile handset, or some small number of mobile handsets. The mobile handset acts like a "walkie-talkie." However, generally, instead of communicating directly to another "walkie-talkie" a mobile handset with push-to-talk typically communicates through a base station to another mobile handset using a single button push to initiate the connection. Additionally, like a "walkie-talkie" when using a mobile handset with push-to-talk, after a user pushes the button they are able to speak without having to wait for the other mobile handset to ring and the other user to answer.

However, some delay between pushing the button and connecting to the other mobile handset may exist. It would be advantageous to try to lower that delay as much as possible. Additionally, while this delay may typically be more noticeable to a user using push-to-talk, or other single button push services, the delay may exist with other mobile handset services including, but not limited to mobile telephone calls and mobile data calls. It would also be advantageous to try to lower the delay as much as possible when using any other communications services that exhibit a delay when communicating with a base station or other transceiver.

One cause of delay when beginning a mobile call, including push-to-talk, and data calls is related to how often a mobile communicates with a base station. Many current mobile handsets are designed to communicate with a base station at specific time intervals. These time intervals are the only time that the mobile handset can begin a mobile call. The longer the delay between intervals, the longer it is likely to take to set up a mobile call. It will be understood by those of skill in the art that the delay will be variable and somewhat random. Depending on when a user initiates a call relative to the next slot cycle. Slot cycle is the time when the mobile handset communicates with the base station. If the user attempts a call close to the next slot cycle, the delay may be relatively short, however, if the user attempts a call just after a slot cycle, the delay may be relatively long.

As stated above one aspect to consider regarding mobile handsets is how often and when the mobile handset should communicate with the base station. Typically, the more often the mobile handset communicates with the base station the faster the mobile handset will be able to respond when the person using the mobile handset attempts to make a call. For example, if the mobile handset communicates with the base station every second, when a user attempts to make a call it will only be one second, at most before the mobile handset is able to communicate with the base station and start the process of placing the call. However, if the mobile handset only communicates with the base station every two seconds, then it could be as long as two seconds before the process of placing the call begins.

So, to speed up placing a mobile call, the mobile handset should communicate with the base station as often as possible. However, communicating with the base station as often as possible has many drawbacks. Transmitting to the base station typically takes power. On a battery-operated device, this can be a critical consideration. Additionally, in many cases the more often a mobile handset communicates with a base station, the fewer mobile handsets that are able to use the base station. This is due to the fact that the base station typically has a limited number of transceivers to communicate with mobile stations. For this reason, each mobile station is given a time when it can communicate with the base station. Multiple mobile handsets are able to communicate with the base station by time-sharing. The more often a mobile handset communicates with the base station, the fewer other mobile handsets can communicate with the base station. For these reasons, and possibly others, the delay between communications between mobile handsets and base stations is not typically made arbitrarily short.

Figure 12:
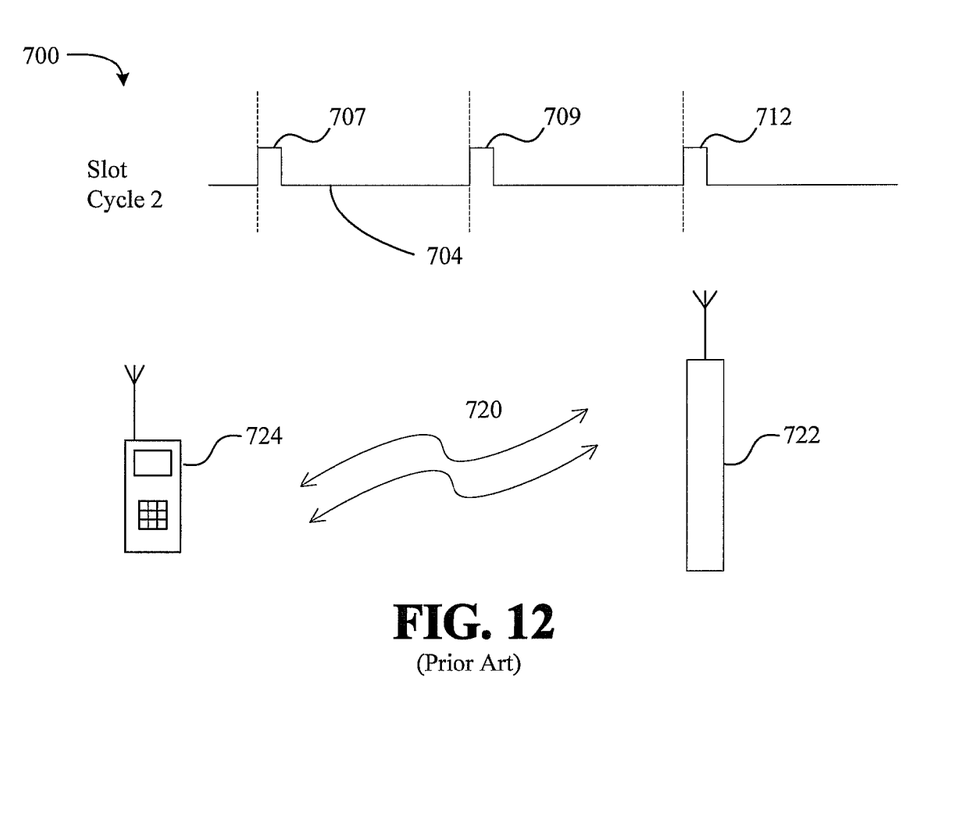
FIG. 12 generally illustrates prior art involving communication between mobile handsets and a base station including a slot cycle graph.

Referring to FIG. 12 more details of communication between mobile handsets and base stations will be discussed. The diagram 700 includes a graph 704. The graph 704 shows when a mobile handset 724 communicates with a base station 722. The communication is shown as electromagnetic signals 720. Communications occur at 707, 709, and 712. It should be noted that this is only one possible example. The time between communications between base station and mobile handset may not always the same.

Typically the slot cycle index is initially negotiated between the base station and the mobile handset. by the manufacturer. The number of clock cycles is known as slot cycle index. Slot cycle index is not a linear. Slot cycle index 0 indicates that communication occurs every cycle. Slot cycle index 1 indicates that a communication occurs every cycle. Referring back to FIG. 12 a slot cycle index 3 indicates that a communication occurs every four cycle. Slot cycle index above slot cycle index 3 are also possible. Slot cycle index timing can be summarized as follows, where x is the slot cycle index:

$$\text{TIME BETWEEN COMMUNICATION} = 1.28 \times (2^n)$$

For example, for slot cycle index 0 a communication occurs every 1.28 seconds, slot cycle index 1 is a communication every 2.56 seconds, and for slot cycle 2 a communication occurs every 5.12 seconds. Other slot cycle indexes are possible. Additionally, "negative" slot cycles are possible. In one possible implementation of "negative" slot cycles the number "n" in the equation above is a negative number. The use of "negative" slot cycles allows communication to occur more often than every 1.28 seconds.

SUMMARY

Many people use mobile handsets. As many users may have noticed, sometimes it can take a while to complete a mobile call. One thing that may affect is known as slot cycle index. The slot cycle index is the amount of time that the mobile handset must wait before communicating with the base station. The higher the slot cycle index the longer the mobile handset must wait before communicating with the base station. The lower the slot cycle index the shorter the delay. However shorter slot cycle priorities limit the number of mobile handsets that can communicate with a base station. Additionally, shorter slot cycle index typically increase the amount of battery power used by the mobile handset, commonly lowering standby and talk time.

The slot cycle index is currently negotiated by a mobile handset and a base station. However, if the slot cycle index could be selected dynamically a mobile handset that operates more efficiently for the user would result. Talk time could be maximized when the battery, or other mobile power source is low, while connect time for a mobile call could be minimized when the battery is near fully charged or at times when the user is likely to make a mobile call. Additionally, location could be used to determine the likelihood that the user will make a mobile call. However, current network usage would typically need to be considered when determining if the slot cycle index should be changed. Mobile handset users could also charged for quicker response times, or mobile handset users on more expensive plans could be given typically faster response times. Many different things can be considered in determining when to adjust slot cycle index. More examples will be given below.

Dynamically adjusting slot cycle index allows a mobile handset to, in some cases, operate more efficiently. In some cases the mobile handset may exhibit faster response time due to lower slot cycle index, while in other cases the mobile handset may use less battery power due to the higher slot cycle index. In addition, the service provider will be able to dynamically change slot cycle index to allow more users access to a base station.

DETAILED DESCRIPTION

Figure 1:
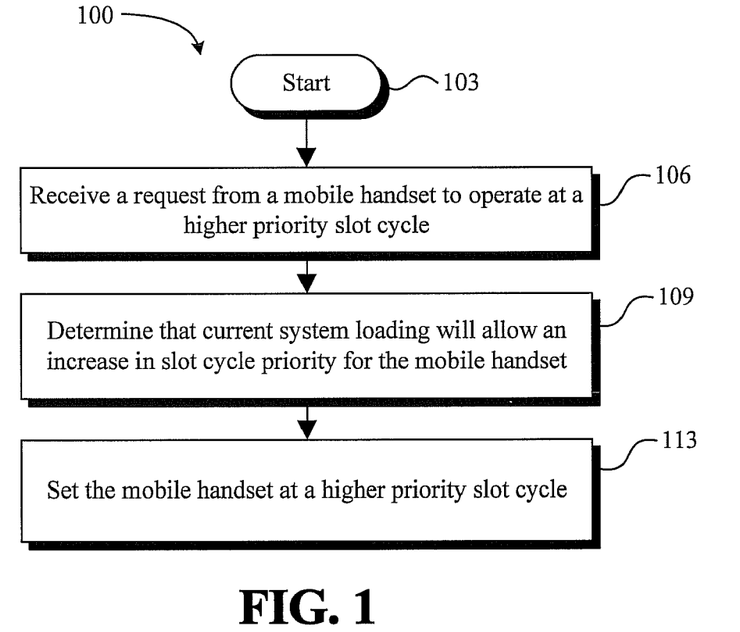
FIG. 1 illustrates a flowchart describing one method of dynamically changing a slot cycle index, according to one embodiment of the present invention.

Several methods of dynamically changing slot cycle index are possible. Referring now to FIG. 1 a flowchart 100 that illustrates one possible example will be discussed.

The flowchart 100 shows one example of a method of dynamically changing slot cycle index. The flowchart 100 begins at 103. In step 106 a request from a mobile handset to operate at a higher slot cycle index is received. The mobile handset may send a request to operate in a higher slot cycle index for several reasons. Typically, the occurrence of a trigger event will cause the mobile handset to send the request. Trigger events at the mobile handset can include the battery power available at the mobile handset, the time of day, or feature availability at the mobile handset. More details regarding trigger events will be discussed with respect to FIG. 3. Additionally, trigger events that are generally related to specific devices, such as the mobile handset or the base station, as well as groups of devices such, as the network will be discussed with respect to FIG. 10.

It is determined if the current system loading will allow an increase in slot cycle index for the mobile handset in step 109. If the current system loading will allow, the mobile handset is set at a higher slot cycle index in step 113. As can be seen in this example, typically, the base station and the mobile station negotiate to determine if the mobile handset should operate in a higher slot cycle index.

The flowchart 100 is one possible example of a method of dynamically changing slot cycle index. Other examples are possible. For example, a request may come from a base station instead of a mobile handset. In this example, the base station sends a request to the mobile handset to operate at a higher slot cycle index. For this example, as discussed with respect to FIG. 1 above, typically, the base station and the mobile handset negotiate to determine if the mobile handset slot cycle index should be changed. Additionally, slot cycle index may be increased, as shown, decreased, or kept the same based on different trigger events.

Figure 2:
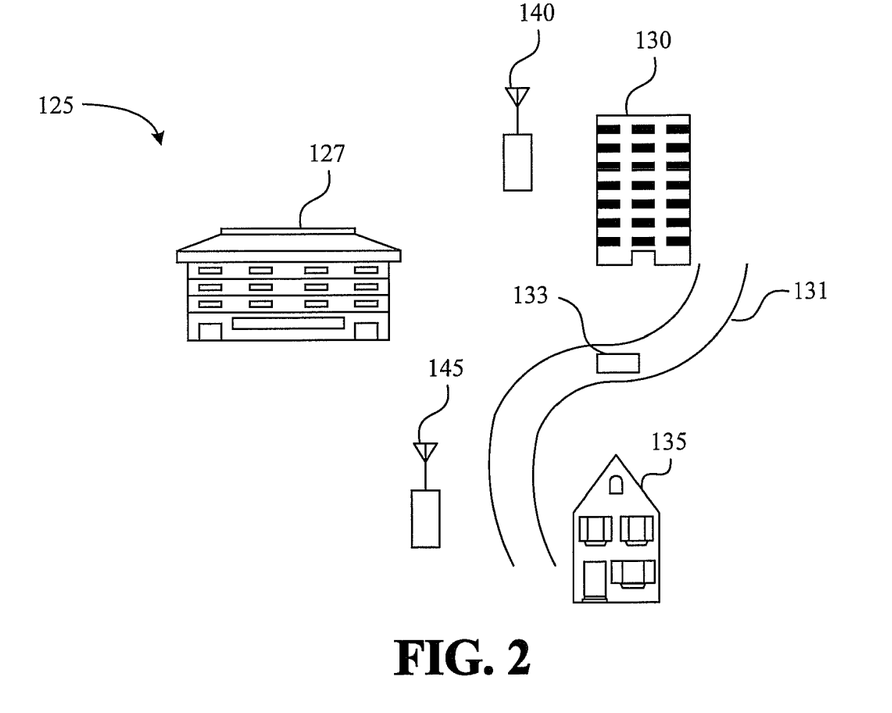
FIG. 2 illustrates a mobile handset user, in an embodiment of the present invention.
Figure 3:
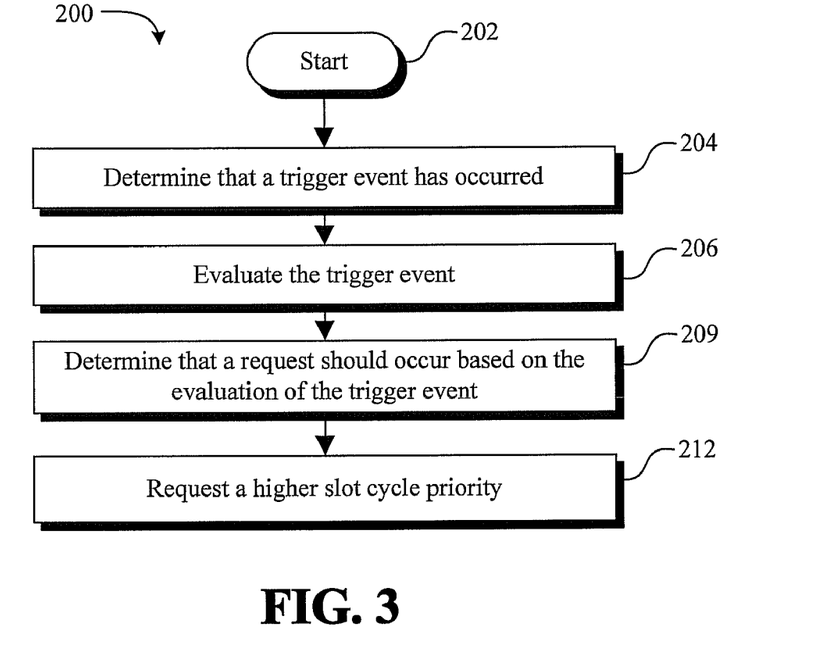
FIG. 3 illustrates a flowchart describing one method of dynamically changing a slot cycle index based on a trigger event, according to one embodiment of the present invention.

Several examples of trigger events will be discussed below with respect to FIG. 3 below. FIG. 3 includes discussions of trigger events that may increase or decrease slot cycle index. In some cases different trigger events may be considered at the same time to determine if slot cycle index should be changed. The term trigger event is used throughout to describe an event that causes the method to change slot cycle index. However, in some cases the term trigger state may be better. For example, if several factors are considered at one time, it is the state of each factor that determines the outcome. Additionally, it may be the change of a single factor that causes the determination to occur. Alternately, several states changing could cause a determination to occur. In this application, the term trigger event will be used to describe a state, or change in state that causes a request to operate at a different slot cycle index to be transmitted. In FIG. 2 an example of a specific mobile handset user will be discussed.

Some advantages include the ability to conserve battery power when the battery is low by raising slot cycle index. However, in some cases it may be determined that slot cycle index should be increased even though the battery is low. Additionally, system loading can typically, in some cases, be lowered if necessary during times users are using up network capacity.

Referring now to FIG. 2 an example will be discussed with respect to a diagram 125. The diagram 125 includes a sports stadium 127, an office building 130, and a road 131. Additionally, the diagram 125 includes a car 133 and a house 135. In the example of FIG. 2 a mobile handset user, Mary, begins her day at the house 135. When at home, Mary does not tend to user her mobile handset. However, during her drive to work Mary tends to make many calls using her mobile handset. Mary's mobile handset requests a higher slot cycle index during times of day that the mobile handset is typically used.

Typically, on her way to work Mary's mobile handset is set at a higher slot cycle index. When Mary arrives at work in her building 130 she continues to use her mobile handset throughout the day. The mobile handset typically operates in a higher slot cycle index. This enables Mary to complete calls more quickly typically. However, Mary's building is close to the sports stadium 127. On days that sports events occur at the stadium 127 many people normally attend, and typically carry mobile handsets. The large number of people at the stadium 127 put a large load on the base station 140 that is near the stadium 127. When the loading at the base station 140 is high, Mary's mobile handset is not allowed to operate at a higher slot cycle index. The base station 140 is able to communicate with more mobile handsets when the slot cycle index is decreased.

It should be pointed out that the discussion of FIG. 2 is only one possible example. Dynamically modifying slot cycle index could occur for a variety of reasons. Additionally, not allowing slot cycle index to be changed could happen for a variety of reasons. Slot cycle index can be increased when a trigger event occurs, as will be discussed with respect to FIG. 3 or slot cycle index can be decreased when a trigger event occurs as discussed with respect to FIG. 4.

Referring now to FIG. 3, a flowchart 200 will be discussed. The flowchart 200 begins at step 202. At step 204 it is determined that a trigger event has occurred. The trigger event is evaluated in step 206 and a determination is made to request a higher priority slot cycle in step 209. The request for a higher priority slot cycle is made in step 212. In the flowchart 200 of FIG. 3 a trigger event occurs that causes a request for a higher slot cycle index. However, a trigger event can also occur that would cause a request for a lower slot cycle index, as will be discussed with respect to FIG. 4. Many events can be considered trigger events. Several examples will be discussed below, however, other examples are possible. One example of a trigger event is battery power. Operating a mobile handset in a high slot cycle index state usually increases the amount of battery power consumed for a given period of time. High battery power may be a trigger event to operate in a higher slot cycle index. Conversely, low battery power may be a trigger event to operate in a lower slot cycle index.

Another example of a trigger event is time of day. If the current time of day is one that a mobile handset user tends to make many calls, or one that the service providers expect many calls to be made, a request to operate in a higher slot cycle index may occur. Again, as with the battery power example, the converse is also true. If it is a time of day when it is unlikely that a call will occur, this may be a trigger event to operate in a lower slot cycle index.

A third example of possible trigger events is system loading. Higher slot cycle index places increased demands on system resources. When system loading is low, slot cycle index may typically be increased without placing a burden on the base station that the based station is unable to meet. However, when system loading is high, one possible way to decrease these demands is to lower the slot cycle index on some mobile handsets. It is important to note that these are only examples.

The examples discussed above and other examples discussed below will be factors considered when deciding to increase or decrease slot cycle index. In some cases several different trigger events will be considered before an increase or a decrease of slot cycle index is made. For example, if battery power is low, the time of day is one that a call is likely to occur, and the system loading would allow for an increase slot cycle index, the slot cycle index may be decreased to save battery power, even though two other factors would allow for an increase in slot cycle index.

Another trigger event is location. The mobile handset may be in a location where the user has made one or more, possibly many, mobile calls in the past. In this case it may be advantageous to increase the slot cycle index of the mobile handset. However, typically, other trigger events will be considered. For example, as discussed with respect to FIG. 2 when Mary is at work but a sporting event is occurring near by, even though she usually makes many calls using her mobile handset, it may not be possible to increase the slot cycle index of her mobile handset because system loading is to large.

Location may effect the decision to increase or decrease slot cycle index in another way. Location tends to effect the amount of transmit power needed to communicate with a base station. In locations where transmit power is high it may be advantageous to decrease slot cycle index. In locations where transmit power is low, it may be advantageous to increase slot cycle index. As with examples discussed above, transmit power can be considered in conjunction with other factors.

In another example, battery power may be high, while system loading is low and time of day is one that a call is likely to occur, however, the mobile handset may be located at a location where a large amount of transmit power is needed to communicate with the base station. In that case it may be advantageous to operate in a lower slot cycle index.

In some cases mobile handset users may pay for higher performance service. For example, users may be more to have higher slot cycle index. In some cases, higher slot cycle index may be included on higher priced plans as part of a package of services provided.

In some cases it may be likely that when a call occurs another call may occur soon after. The fact that a call has recently occurred may be used as a trigger event to increase slot cycle index. One case where several calls in rapid succession tend to be likely is one button push services, such as push-to-talk.

Additionally, in some cases a feature may exist that requires higher slot cycle index. Or, in some cases the carrier or the mobile handset may desires higher slot cycle performance. Feature availability may be a trigger event. When a feature is available, for example, due to mobile handset proximity to a base station that supports the feature, the availability of the feature may trigger an increase, or decrease in slot cycle index, depending on the requirements of the feature. As with other trigger events, several trigger events can be combined to determine if slot cycle index should be increased or decreased.

Figure 4:
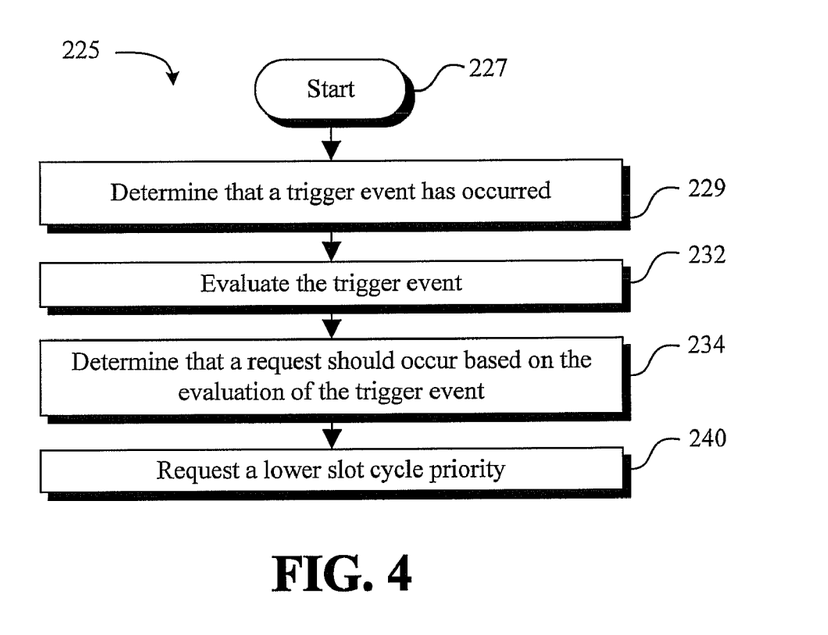
FIG. 4 illustrates a flowchart describing one method of dynamically changing a slot cycle index based on a trigger event, according to one embodiment of the present invention.

As was discussed above, with respect to FIG. 3, a trigger event may trigger an increase in slot cycle index, while another trigger event may cause a decrease in slot cycle index. As shown in FIG. 4, a trigger event may cause a request for a lower slot cycle. FIG. 4 is a flowchart 225. The flowchart 225 begins at step 227. At step 229 it is determined that a trigger event has occurred. In step 232 the trigger event is evaluated and it is determined that triggers a lower slot cycle has occurred. In step 234 it is determined that a request for a lower slot cycle should occur. A lower priority slot cycle is requested at step 240. Summarizing FIGS. 3 and 4, a trigger event occurs and depending on the type of trigger event a request for a lower or higher slot cycle occurs. In some cases a combination of trigger events or current states may be considered when deciding to request a higher or lower slot cycle. Additionally, trigger events or states may occur in a mobile handset, at a base station, or they may be inherent in the service that a user has purchased. For examples, see FIG. 10 below. The combination of trigger events discussed above could occur in a combination of the mobile handset, and base station and could also be based on the service purchase.

Advantages may include the ability to increase performance of a mobile handset during periods of time or in locations where a mobile handset user is likely to make a mobile call.

It will be clear to those of skill in the art that the converse is also true. The lack of some trigger events may cause slot cycle index to be increased.

Figure 5:
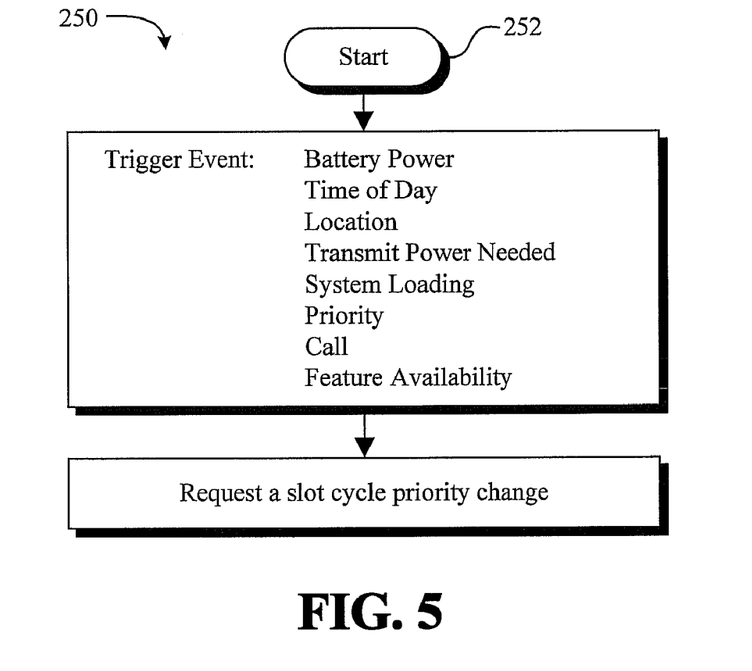
FIG. 5 illustrates a flowchart describing one method of dynamically changing a slot cycle index based on a trigger event, according to one embodiment of the present invention.

Referring now to FIG. 5, a flowchart 250 will be discussed. The flowchart 250 is similar to the flowchart 200 of FIG. 3. The flowchart 250 includes the addition of several possible trigger events, listed at step 255. Beginning at 252, the flowchart 250 determines that a trigger event has occurred at step 255. Step 255 is the same or similar to step 205 of FIG. 3. Possible trigger events include, but are not limited to: available battery power, time of day, location, transmit power needed, system loading, priority, occurrence of a call, and feature availability. As stated above, several trigger events can be considered when determining if slot cycle index should be increased, decreased, or kept the same. Additionally, each trigger event may be given a different weight when determining slot cycle index. At step 260 a request for a slot cycle index change occurs. Step 260 of FIG. 5 is the same or similar to a combination of 212 of FIG. 3 and step 240 of FIG. 4.

Referring back to step 255, low battery power would typically be considered a trigger event for a lower priority slot cycle because higher priority slot cycles typically consume more battery power. The converse is also true. A high battery power would typically be considered a trigger event for a higher priority slot cycle. It should be noted that this is only one example. It will be understood by those of skill in the art that "low" battery power and "high" battery power are not precisely defined here and may vary widely from one specific implementation to another.

Power stored in a battery can be thought of as a predetermined percentage, for example, 100% or fully charged, 75% charged, 50%, 25% charged, etc. Generally the percentage charge of a battery can be a function of the battery voltage, which can decrease as the battery discharges. Thus the charged state of a battery in a battery powered mobile handset can be a trigger event. For example, if enough charge is stored in the battery to complete at least one call, this can be a trigger event to request a different slot cycle index. The percentage charge can also be a trigger event, for example, greater than 25%, 50%, or 75%. In an embodiment that uses a mobile power source other than a battery, reaching a predetermined level of mobile power can be a trigger event.

In some cases battery power may be considered with other trigger events. Additionally, in some examples, battery power may not be considered at all. Specific trigger events used in any particular application can be customized depending on the needs of that particular application. Some trigger events will be discussed further with respect to FIG. 10. Advantages may include the ability to change slot cycle index to conserve battery power when battery power is low.

When placing a call, especially a push to talk call, it may be likely that several calls will be placed in rapid succession. Generally increasing slot cycle index when a call has recently been placed will tend to have the advantage of increasing the ability of the mobile handset to place calls rapidly. For example, slot cycle index can be increased when a call has been placed within ten minutes, thirty minutes, or some other period of time.

Figure 6:
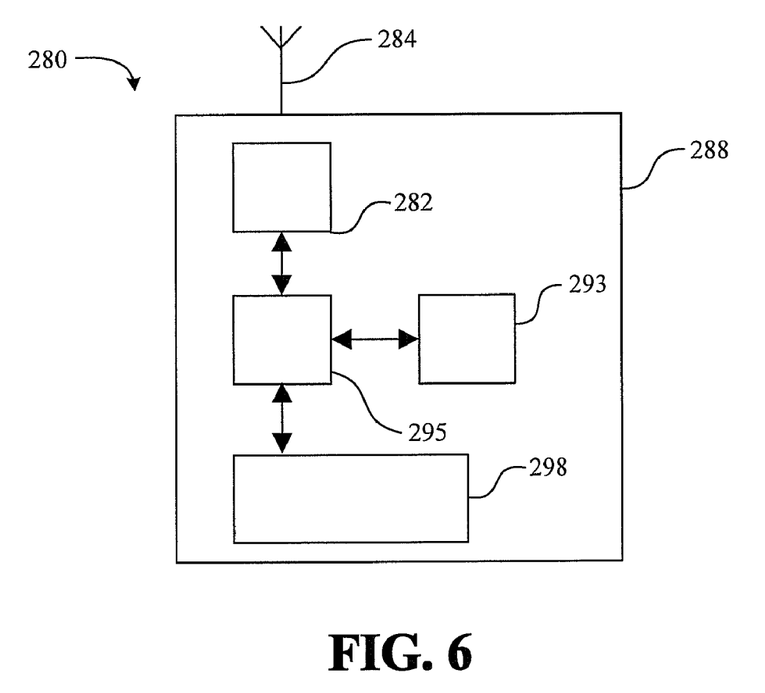
FIG. 6 illustrates one embodiment of a handset.

Referring now to FIG. 6, a mobile handset 280 will be discussed. The mobile handset 280 includes an antenna 284. The antenna 284 is a transducer for coupling radio frequency signals to a transceiver 282. The transceiver 282 includes a transmitter and a receiver for sending and receiving radio frequency signals. The transceiver 282 is coupled to a processor 295. The processor 295 is used to perform processing function necessary for the mobile handset. It will be understood by those of skill in the art that the processor could be a single processor or multiple processors. Additionally, the processor could be a microprocessor, a microcontroller, or multiple microprocessors or microcontrollers, or similar devices. The processor could be a digital signal processor or multiple digital signal processors. The processor could be a combination of different types of processors, including, but not limited to microprocessors, microcontrollers, and digital signal processors. The processor could also be stand alone digital logic, programmable logic, such as field programmable gate arrays, complex programmable logic devices, or other forms of programmable logic. The processor could be any circuit capable of performing the steps included in the claims. The processor 295 is coupled to a memory 293. The memory 293 is used to store information used by the processor 293.

A mobile power source in the form of a battery, 298 is coupled to the processor to provide power to the processor. It will be clear to those of skill in the art that the battery 298 may provide power to other circuits in the mobile handset. Additionally, the battery 298 may be other types of mobile power sources, for example, the battery 298 may actually be a fuel cell, or other mobile power source. Additionally, the mobile handset is enclosed by a case 288. In many cases lowering the slot cycle index will tend to conserve battery power at the mobile handset. Advantages may also include the ability to increase a mobile handsets performance when placing a push-to-talk call. In some cases the push-to-talk call may connect more quickly.

Figure 7:
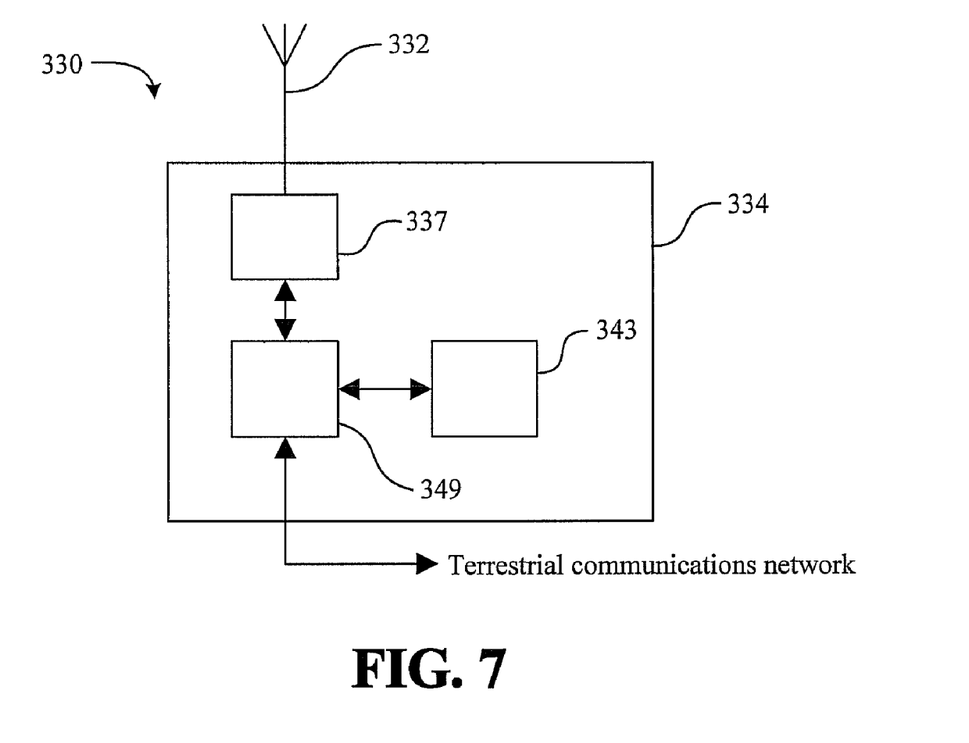
FIG. 7 illustrates a base station, in an embodiment of the present invention.

Referring now to FIG. 7, a base station 330 will be discussed. The base station 330 includes an antenna 332. The antenna couples radio frequency signals to a transceiver 337. The transceiver 337 is coupled to a processor 349. Additionally, the processor 349 typically communicates with a terrestrial communications network. The processor 339 is coupled to a memory. The base station 330 is enclosed by a case 334. Allowing the base station to dynamically change the slot cycle index used by a mobile station will tend to have the advantage of allowing the base station to manage system loading. When system loading is high, slot cycle index may be decreased. Decreased slot cycle index decreases how often mobile handsets communicate with the base station.

Figure 8:
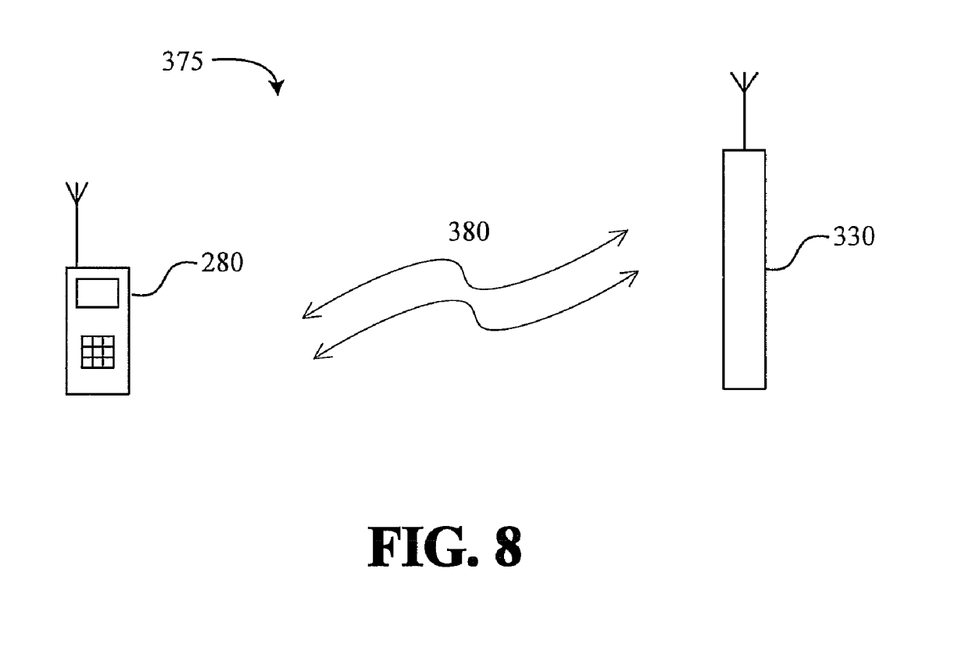
FIG. 8 illustrates a base station, a mobile phone, and a method of use, in an embodiment of the present invention.

Referring now to FIG. 8 a diagram 375 will be discussed. The diagram 375 includes a mobile handset 280. The mobile handset 280 is the same or similar to the mobile handset 280 of FIG. 6. Additionally, the diagram 375 of FIG. 8 includes a base station 330. The base station 330 is the same or similar to the base station 330 of FIG. 6. The mobile handset 280 and the base station 330 transmit electromagnetic signals to allow information to be communicated between the two devices. It will be clear to those of skill in the art that the base station may communicate with multiple mobile handsets, including the mobile handset 280. In some cases not all mobile handsets will have dynamically adjustable slot cycle index. In other cases, it is possible that all mobile handsets will have adjustable slot cycle index. Additionally, it is important to note that typically the base station 330 and the mobile handset 280 will negotiate to determine slot cycle index setting. Many different ways to negotiate slot cycle index setting will be apparent to those of skill in the art. For example, the multiple trigger events, as discussed above, can be combined. Different trigger events can have different "weights" associated with them when trying determine what course of action to take.

Additionally, in some cases it may be advantageous to have some trigger events cause slot cycle index to change independent of any other trigger event. For example, when the battery is low, it may be advantageous to always lower slot cycle index regardless of the other trigger events. Similarly, when system loading is high, it may be advantageous to always lower slot cycle index. However, it is important to note that these are only possible examples. In other cases these examples may not apply. In some cases slot cycle index may be increased or kept the same when the battery is low or system loading is high.

In another example, in some cases it may be advantageous to allow one device to dictate slot cycle index to another. For example, perhaps it would be advantageous to not allow a mobile handset to refuse a request to lower slot cycle index. In this example, assume that system loading is high. A base station that is communicating with a mobile station sends a request, or in this case, perhaps it can be considered a command, to operate in a lower slot cycle index. In this example, the mobile handset is required to operate in the lower slot cycle index. It again should be stressed that these are only examples. Other examples are possible. It will be clear to those of skill in the art that specific trigger events, specific "weightings" for trigger events, specific combinations of trigger events, and specific ways to negotiate dynamic slot cycle index can be determined based on the needs of a particular implementation. Many different possibilities will be clear to those of skill in the art. For brevity, only a few examples are shown here. Advantages may include the ability to lower power used to transmit between the mobile handset 280 and the base station 330. This may be especially important when the battery on the mobile handset 280 is low.

Figure 9:
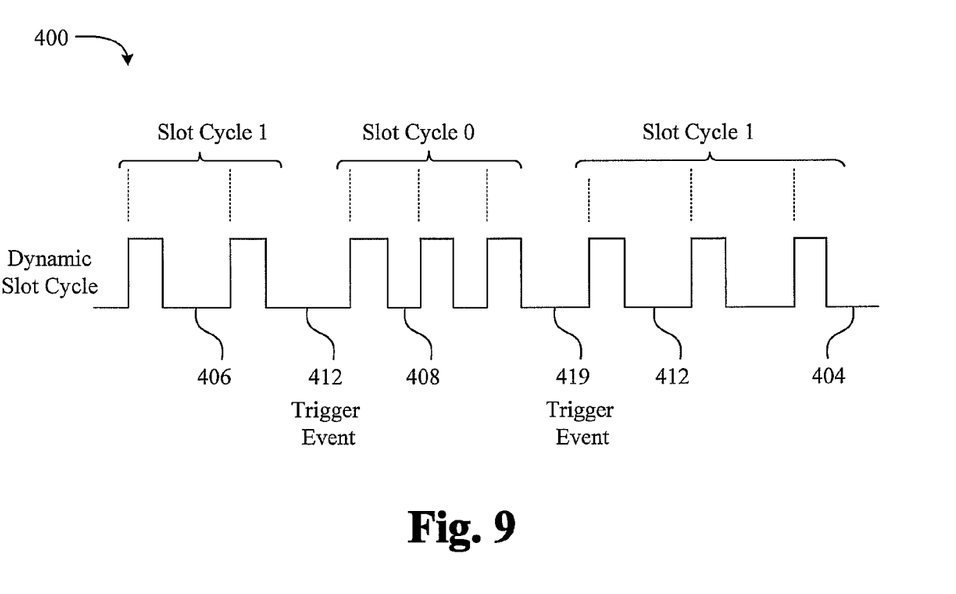
FIG. 9 illustrates a graph of a clock signal for reference timing, in an embodiment of the present invention.

Referring now to FIG. 9, a diagram 400 will be discussed. The diagram 400 includes a graph of a clock signal 402. The clock signal 402 is a reference for timing of transmissions between a base station 330 and a mobile handset 280. For example, the base station 330 and the mobile handset 280 of FIG. 8. A graph 404 of a dynamic slot cycle is also shown on the diagram 400. The graph includes a period of time when the handset 280 operates in slot cycle 1406. After a trigger event 412 the mobile handset 280 operates in slot cycle 0 for a period of time. Another trigger event occurs at 419. The trigger event 419 is a trigger event that causes a decrease in slot cycle index. After 419 the mobile handset returns to slot cycle 1. FIG. 9 is only one possible example, other examples are possible. Changes in slot cycle can occur other than just changing from slot cycle 0 to slot cycle 1. For example mobile handset could change from slot cycle 2 to slot cycle 4. Slot cycle could be changed by multiple slot cycles in a single change, for example, as stated above, from slot cycle 2 to slot cycle 4.

As stated above changes in slot cycle could be based a combination of trigger events. For example, the trigger events could be combined in the form of a function. Additionally, the combination of trigger events could be weighted differently. Some trigger events could be considered more important than others. The trigger events could be combined in the form of a function. For example, slot cycle change could be a function of battery power available, system loading, and location.

In one example battery power could be considered more important than the other two trigger events. In this example battery power could be given more weight in a function the determines if a trigger event should occur.

Additionally, these trigger events could be continuously monitored. In another example the trigger events can be monitored continually. In yet another example, the trigger events could be monitored only when one or more trigger events change. It will be clear to those of skill in the art that this is only an example, other examples, using other trigger events, or other combinations of trigger events are possible. Advantages include the ability to change slot cycle based on the conditions during a specific time period.

Figure 10:
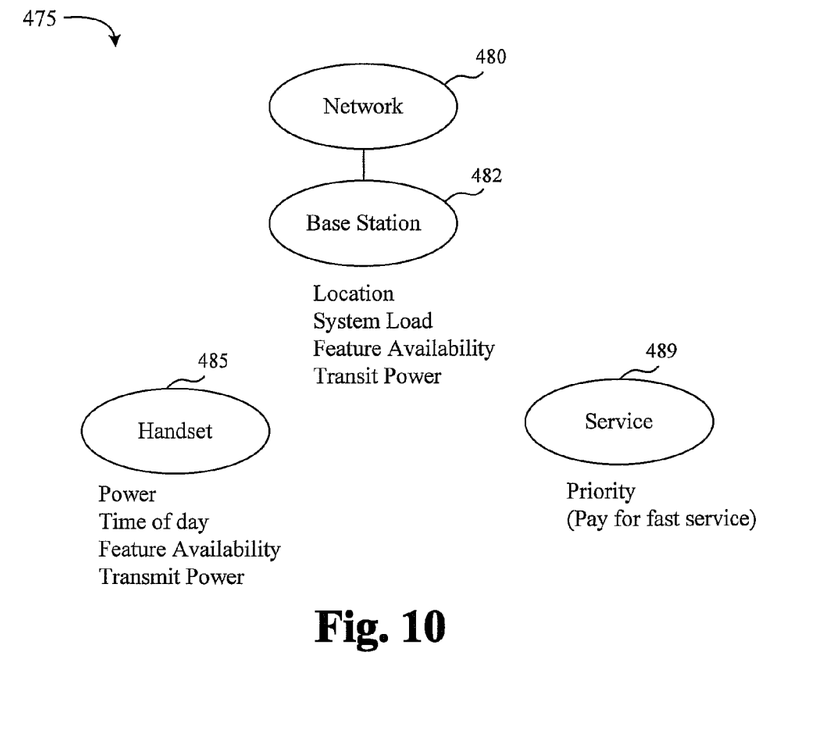
FIG. 10 illustrates a system and method for dynamically changing a slot cycle index, according to one embodiment of the present invention.

Referring now to FIG. 10 a diagram 475 is shown. The diagram 475 generally shows the relationship between a network 480, a base station 482, a mobile handset 485, and services 489. On the diagram under base station 482 location, system load, and feature availability are listed. These trigger events are typically associated with the base station 482, however, other groupings are possible. For example, feature availability is listed under both base station 482 and handset 485. Additionally, if the handset could determine system loading, then system loading could be listed under handset 485. However, handsets do not typically have access to system loading information, so system loading information, so system loading has not been included under handset 485. The diagram is meant to be general and to show typical groups of trigger events and what devices tend to monitor for those trigger events. But, as can be seen above, the lists are not exhaustive.

The section for handset 485 includes a list of trigger events such as power, time of day, and feature availability. As stated above, the list is intended to be an example. The list is not intended to be exhaustive. Other trigger events are possible. Additionally, trigger events could occur related to headings such as base station 482, handset 485, and service 489 in ways not shown on FIG. 10. For example, if a base station 482 is able to determine battery power available then power could be listed under base station 482 above. However, since typically, the base station 482 does not know the battery power available to a mobile handset 485, power is not listed under base station 482.

As stated above, FIG. 10 also includes service 489. Service 489 includes priority service. In some cases a customer may pay extra for faster call completion typically brought about by higher slot cycle index. In other cases the service may be a part of other prepackaged services. Advantages may include the increased revenue due to the ability to charge some customers for typically faster call completion. However, in some cases, the service may be included with specific calling plans.

Figure 11:
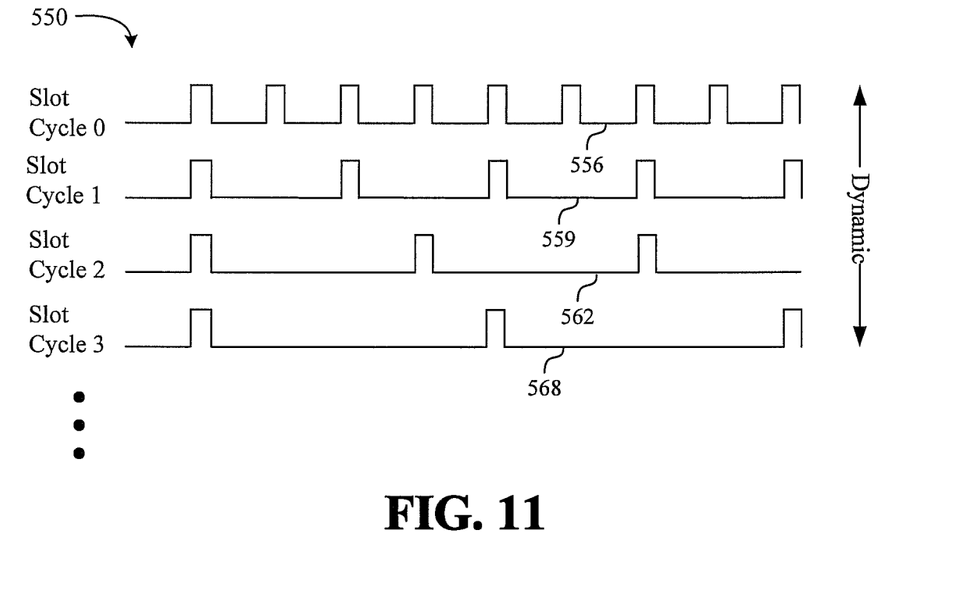
FIG. 11 illustrates a graph showing several possible slot cycle priorities, in an embodiment of the present invention.

Referring now to FIG. 11 a diagram 550 is shown. The diagram 550 is similar to the diagram 400 of FIG. 9. However, the diagram 550 shows several possible slot cycle priorities 559,562,568,571 and indicates that a mobile handset can switch between the different priorities. Using the diagram 550, the different slot cycle priorities 559, 562, 568,571 can easily be compared. It can be seen from the diagram 550 that the higher the slot cycle index, the more often the mobile station communicates with the base station. It should be noted that higher slot cycle index is indicated by a lower slot cycle number. For example' slot cycle 0 is a higher slot cycle index than slot cycle 1. The ability to dynamically change between slot cycle priorities has many advantages, as discussed above. Dynamically changing slot cycle index typically allows a mobile handset to operate more efficiently and in some cases adapt to the current state of the handset, the network, or the service purchased.

Many examples are discussed above. However, these are only examples. Other examples are possible. Additionally, many advantages are discussed above. However, these are only possible advantages. Advantages may vary from one specific implementation to the next. Additionally, some advantages may be an important aspect of one implementation while unimportant or possibly not included in another. Embodiments should only be limited by the claims.

The invention claimed is:

1. A base station comprising:
a processor configured to determine that a request for a different slot cycle index should be sent to a mobile handset based on the occurrence of a trigger event at the mobile handset;
a transmitter coupled to the processor, the transmitter configured to send the request for the different slot cycle index to the mobile handset to invoke a slot cycle index negotiation between the mobile handset and the base station; and,
a receiver configured to receive slot cycle index negotiation communications from the mobile handset, the slot cycle index negotiation based on multiple trigger events.

2. The base station of claim 1, wherein the slot cycle index negotiations are based on a weighting of the multiple trigger events.

3. The base station of claim 1, wherein the trigger event comprises a determination that a current time is between two predetermined times.

4. The base station of claim 1, wherein the trigger event is determining that a current location is a location where a mobile user has made a mobile call in the past.

5. The base station of claim 1, wherein the trigger event comprises a determination that a mobile call had been placed within a maximum time.

6. The base station of claim 1, wherein the trigger event comprises a determination that a power source of for the mobile handset is more than a minimum percentage charged.

7. The base station of claim 1, wherein the trigger event is a function of multiple trigger events.

8. A mobile wireless telephone network comprising:
a mobile handset; and
a base station to communicate with the mobile handset, the mobile handset and the base station each comprising:
a processor configured to determine that a request for a different slot cycle index should be sent based on the occurrence of a trigger event, wherein the trigger event is not directly related to an availability of communication resources, and
a transmitter coupled to the processor, the transmitter configured to send the request for the different slot cycle index to invoke a slot cycle index negotiation between the mobile handset and the base station;
where in the base station further comprises a base station receiver configured to receive uplink slot cycle index negotiation communications from the mobile handset, the mobile handset comprising a handset receiver configured to receive downlink slot cycle index negotiation communications from the base station, the slot cycle index negotiation based on multiple trigger events.

9. The mobile wireless telephone network of claim 8, wherein the slot cycle index negotiations are based on a weighting of the multiple trigger events.

10. The mobile wireless telephone network of claim 8, wherein the trigger event comprises a determination that a current time is between two predetermined times.

11. The mobile wireless telephone network of claim 8, wherein the trigger event is a function of multiple trigger events.

12. A method of operating a base station within a mobile wireless telephone network comprising:
determining that a request for a different slot cycle index should be sent based on the occurrence of a trigger event, wherein the trigger event is not directly related to an availability of communication resources, and wherein the trigger event is a function of multiple trigger events; and
sending the request for the different slot cycle index to a mobile handset to invoke a slot cycle index negotiation between the mobile handset and the base station.

13. The method of operating a mobile wireless telephone network of claim 12, wherein the trigger event is one of more of reaching a predetermined time of day, reaching a predetermined location, and reaching a predetermined charge level of a mobile power source associated with the mobile handset.

14. The method of operating a mobile wireless telephone network of claim 12, wherein the trigger event is a function of charge level of a mobile power source, system loading, and time of day.

15. The method of operating a mobile wireless telephone network of claim 12, wherein the trigger event is reaching a predetermined system loading at the network.

16. The method of operating a mobile wireless telephone network of claim 12, wherein the trigger event is the mobile handset being associated with a higher level of service when communicating with the base station.

17. The method of operating a mobile wireless telephone network of claim 12, wherein the trigger event is an occurrence of a mobile call by the mobile handset.

* * * * *